(12) United States Patent  
Bayer

(10) Patent No.: US 7,738,771 B1  
(45) Date of Patent: Jun. 15, 2010

(54) DIGITAL VIDEO RECORDER ALERTING

(75) Inventor: Paul Joseph Bayer, Arlington, MA (US)

(73) Assignee: WSI Corporation, Andover, MA (US)

( * ) Notice: Subject to any disclaimer, the term of this patent is extended or adjusted under 35 U.S.C. 154(b) by 1254 days.

(21) Appl. No.: 11/269,964

(22) Filed: Nov. 8, 2005

(51) Int. Cl.
*H04N 5/76* (2006.01)

(52) U.S. Cl. .......................................... 386/67; 386/68

(58) Field of Classification Search ...................... 386/1, 386/45–46, 67–69, 93
See application file for complete search history.

(56) References Cited

U.S. PATENT DOCUMENTS 5,701,161 A * 12/1997 Williams et al. ............ 348/468
6,526,268 B1 * 2/2003 Marrah et al. ............ 455/186.1
6,842,628 B1 * 1/2005 Arnold et al. ............ 455/556.2

* cited by examiner

*Primary Examiner*—Thai Tran
*Assistant Examiner*—Nigar Chowdhury
(74) *Attorney, Agent, or Firm*—Lawrence A. Aaronson, P.C.

(57) ABSTRACT

Systems and methods of providing alerts on a recording device. The alerting service is provided on a digital video recorder (DVR) or other computing device as an application that is loaded into memory. The DVR is configured with geographic information and is able to determine its geographic location. A data channel is used for receiving the emergency bulletins. A central database system receives the emergency bulletins and transmits to the DVR. The DVR may process the bulletins to select those which are geographically relevant. The DVR displays the bulletins on top of the video signal that it is sending to a display device. The bulletin is displayed even if the user is pausing, rewinding, fast-forwarding, altering the display of the program content, or controlling the DVR.

6 Claims, 4 Drawing Sheets ial Video Recorder Alerting

DIGITAL VIDEO RECORDER ALERTING

FIELD OF THE INVENTION

The present invention is directed to digital recording devices. In particular, the present invention is directed to providing alerts regarding current information to viewers watching recorded content on a digital recording device.

BACKGROUND OF THE INVENTION

Conventional recording devices such as video cassette recorders (VCRs) and digital video recorders (DVRs) provide a convenience to viewers in that they provide for recording of audio/video content for later viewing. This is the so-called "time-shifting" of programming content. Currently, television viewers watching over-the-air, cable or satellite broadcasts are alerted about emergency situations, such as severe weather, through the Emergency Alert System. A problem with viewing time shifted content is that viewers will not receive such alerts. For example, a viewer may be watching a recorded episode of his/her favorite television show while a severe storm is approaching. Instead of the severe weather alert for the viewing area, the viewer continues to watch the recorded content, unaware of the approaching danger. Similarly, the viewer would miss breaking news or traffic reports that may be of relevance to the viewer.

SUMMARY OF THE INVENTION

Systems and methods of providing alerts on a recording device. The present invention provides for delivery of bulletins, alerts, breaking news, etc., to digital video recorders (DVRs) and the like. According to an embodiment, the alerting service is provided on the DVR as an application that is loaded into memory. The DVR is configured with geographic information and is able to determine its geographic location. A data channel on a satellite downlink or cable connection is set for broadcasting the emergency bulletins. A central database system receives the emergency bulletins and transmits to the DVR. The DVR process the bulletins and selects those which are geographically relevant. The DVR displays the bulletins on top of the video signal that it is sending to a display device. The bulletin is displayed even if the user is pausing, rewinding, fast-forwarding, altering the display of the program content, or controlling the DVR.

The bulletins may also be provided as part of a subscription service. The consumer first subscribes to a subscription service and provides geographic information that is used in selecting which bulletins they will receive via the service. The DVR attaches to the service provider and listens for emergency bulletins. The bulletins are sent to the connected DVRs and displayed on top of the video signal that it is sending to the display device The alerting mechanism may be implemented on other devices, such as a set-top, personal computer, handheld device, etc. through which the user is viewing recorded content. Additional features are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
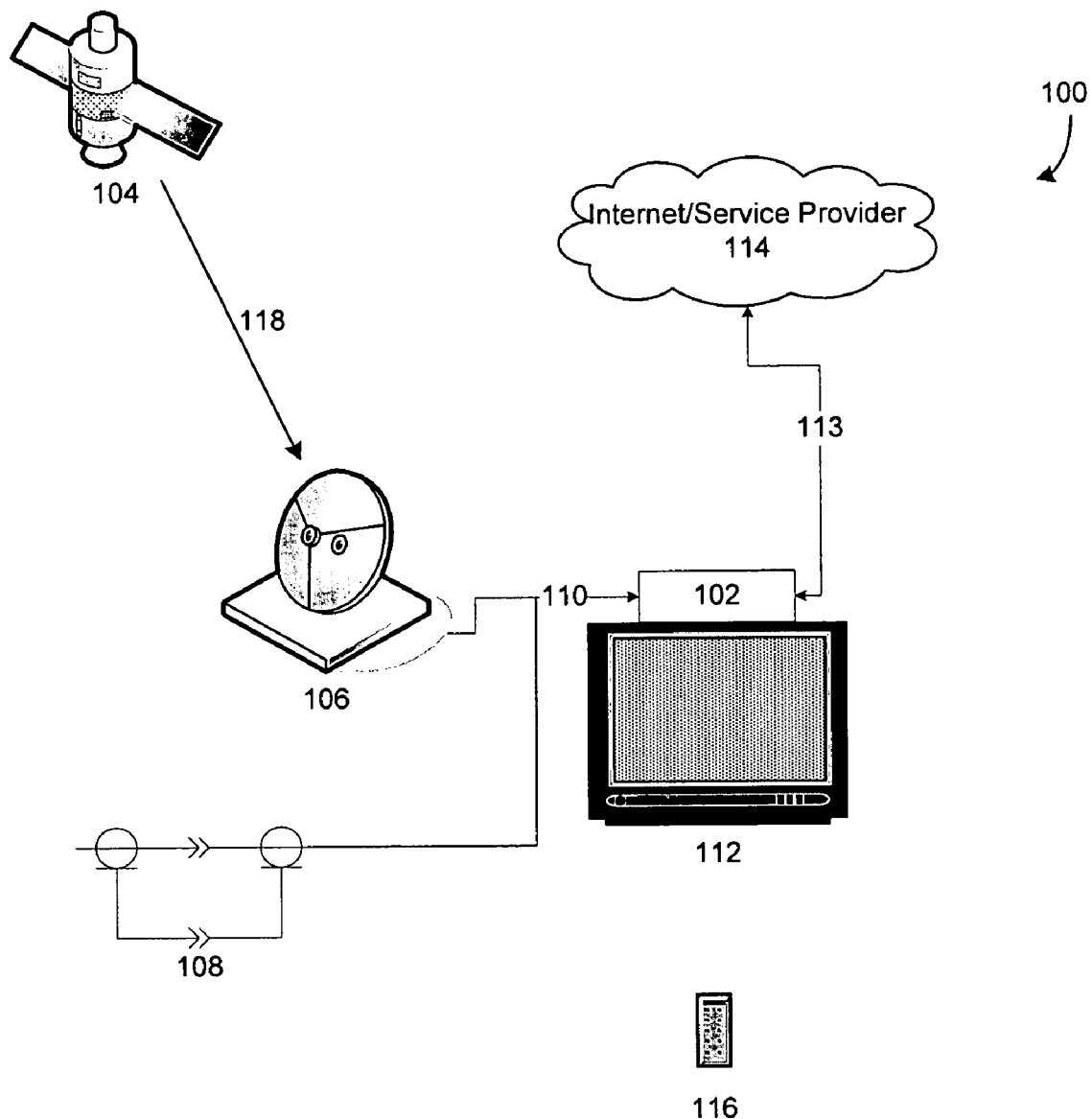
FIG. 1 is an overview of the environment in which the present invention operates.

FIG. 1 is an exemplary arrangement 100 of a digital video recorder (DVR) 102 within a direct broadcast satellite or cable system. In the exemplary embodiment of FIG. 1, the system 100 may include a transmit antenna station a satellite 104, receive antenna 106 and/or a set-top box equipped with a DVR 102.

A digital audio and video television data signal (A/V signal) is provided via a satellite 104, a downlink 118, and a receive satellite antenna 106, cable connection 108, or antenna connection (not shown). As illustrated in FIG. 1, a coaxial cable 110 connects the satellite antenna 106 or cable connection 108 to the DVR 102 to receiving programming and content from an satellite TV provider or cable MSO. The DVR 102 may further be connected to a display 112, such as a standard definition television, a high definition television or a PC monitor and also may be connected to a telephone line, broadband connection, LAN, WAN, MAN 113 to e.g., the Internet and/or a service provider 114. The DVR 102 may be controlled via a remote control 116 as is well known in art, using known RF and/or IR transmission and reception techniques.

FIG. 1 also illustrates the general data flow in a direct broadcast satellite or cable system. In operation, an uplink facility or head end receives video and audio programming from a number of sources, including satellites, terrestrial fiber optics or cable. Preferably, the received programming signals, along with data signals such as electronic scheduling data and conditional access data, are sent from some commercial source to a video/audio/data encoding system within uplink facility or head end. The programming may be digitally encoded and multiplexed into a packetized data stream using a number of conventional algorithms, including convolution error correction and compression, for example.

Figure 2:
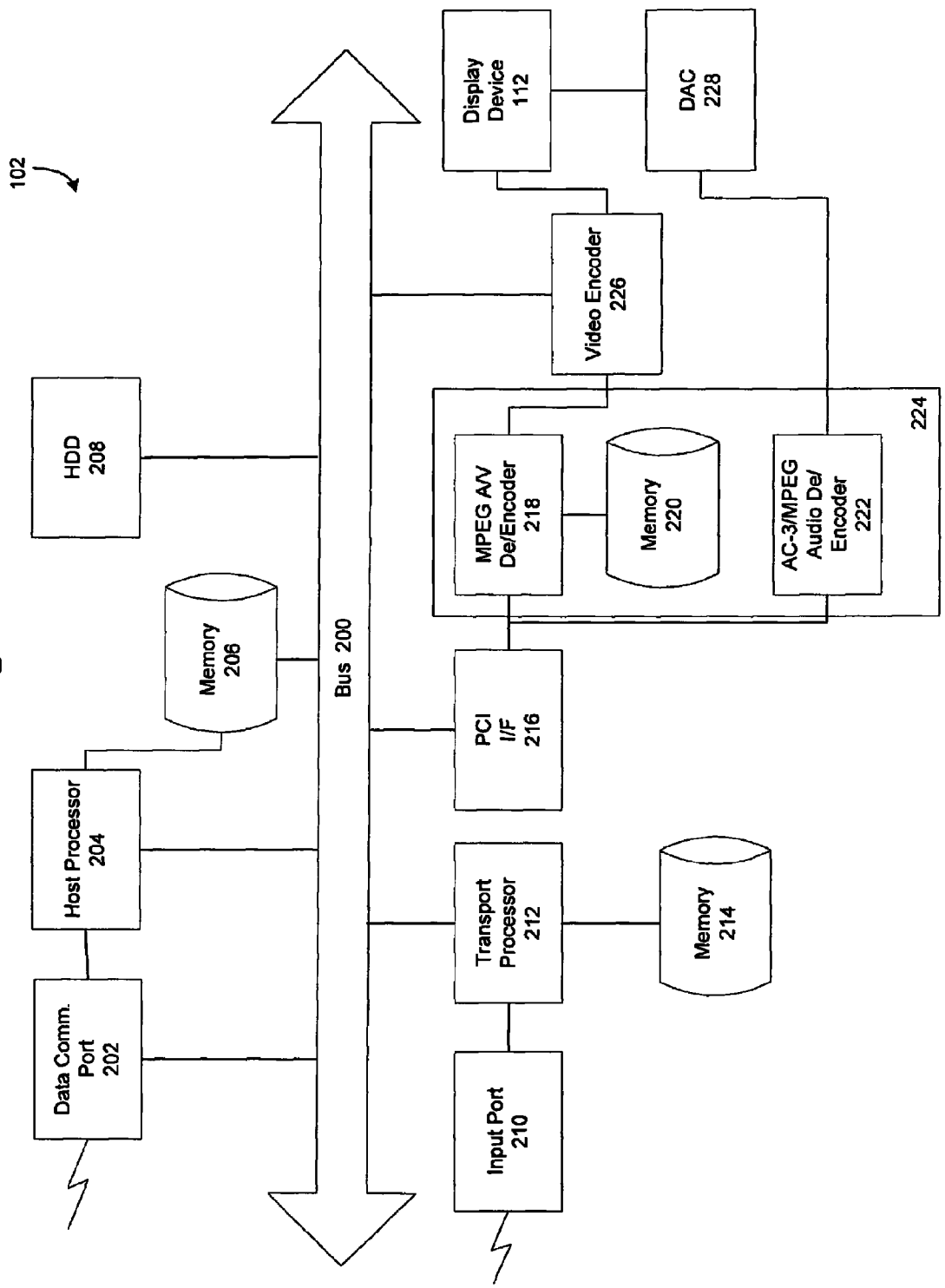
FIG. 2 is a block diagram overview of the various components of a computing device that is adapted to digitally record programming content.

FIG. 2 illustrates an exemplary architecture of the DVR 102. The DVR 102 utilizes a bus 200 to interconnect various components and to provide a pathway for data and control signals. A data communications port 202, a host processor 204, a memory device 206 and a hard disk drive (HDD) 208 are connected to the bus 200. The data communications port 202 is used to communicate to the Internet and/or service provider 114 via known mechanisms. The host processor 204 may also have a direct connection to the memory 206 (i.e., such that the memory 206 is associated as the memory for host processor 204). The memory 206 may include memory devices such as EDO RAM (extended data output DRAM), BEDO RAM (Burst EDO RAM), RLDRAM by Rambus, Inc., SLDRAM by the SyncLink Consortium VRAM (video RAM), or any other known or developing memory that is writeable may be sufficient as memory device 206.

As further shown in FIG. 2, a transport processor 212 and a PCI I/F 216 (peripheral component interconnect interface) are connected to the bus 200. The transport processor 212 also has a connection to an input port 210 and a memory 214. The memory 214 has the same attributes as the memory 206 and may be replaced with any of the other above-noted alternative memory devices. Furthermore, the PCI I/F 216 is connected to a decoder and/or encoder 224. The decoder/encoder 224 is connected to a video encoder 226. The decoder/encoder 224 may include both an MPEG A/V decoder/encoder 218 and an AC-3/MPEG audio decoder/encoder 222, the output of the latter being sent to the display device 112 after conversion in a digital-to-analog converter (DAC) 228.

The output of video encoder 226 is in turn sent to the display device 112. The video output from video encoder 226 and/or audio from audio decoder 222 or DAC 228 may also be sent to external devices or systems operatively connected to the DVR 102, such an off-broadcast system, cable TV system or other known systems which can reproduce the encoded audio and/or video signals for reproduction and/or display. This may also include a PC that can play video or audio files containing the encoded A/V data sent from the DVR 102, for example.

The bus 200 may be implemented with conventional bus architectures such as a peripheral component interconnect (PCI) bus that is standard in many computer architectures. The data communications port 202 may be an Ethernet connection, modem, or other standard communications interface, as known by those of ordinary skill in the art. The host processor 204 may be constructed with conventional microprocessors such as the currently available PENTIUM processors from Intel Corp. The host processor 204 performs non real-time functions in the DVR 102, such as providing a graphical-user interface and browser functions. A browser is a software engine that presents the interface to, and interacts with, a user of the DVR 102. The browser is responsible for formatting and displaying user-interface components and pictures. Typically, the user interface is displayed as a Graphical User Interface (GUI).

The HDD 208 is an example of a mass storage device. In other words, the HDD 208 may be replaced with other mass storage devices as is generally known in the art, such as known magnetic and/or optical storage devices, (i.e., embodied as RAM, a recordable CD, a flash card, memory stick, etc.). In an exemplary configuration, HDD 208 may have a capacity of at least about 20 GBytes, which is used for various applications and pause features in DVR 102.

The transport processor 212 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 212 may integrate system peripherals such as interrupt, timer, and memory controllers on-chip, including ROM, memory, DMA controllers; a packet processor, crypto-logic, PCI compliant PC port, and parallel inputs and outputs. The implementation shown in FIG. 2 actually shows the memory 214 as being separate from the transport processor 212, it being understood that the memory 214 may be dispensed with altogether or consolidated with memory 206. In other words, the memories 206 and 214 need not be separate devices and can be consolidated into a single memory or other memory device.

The input port 210 receives audiovisual bitstreams that may include, for example, MPEG-1 and MPEG-2 video bitstreams, MPEG-1 layer II audio bitstreams and DOLBY DIGITAL (AC-3) audio bitstreams. Exemplary A/V bitrates may range from about 60 Kbps to 15 Mbps for MPEG video, from about 56-384 Kbps for MPEG audio, and between about 32-640 Kbps for AC-3 audio. The single-stream maximum bitrate for DVR 102 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 640 kbps. Alternatively, an analog signal may be provided to the input port 210.

The decoder/encoder 224 may be constructed as shown in FIG. 2 by including the MPEG A/V decoder/encoder 218 connected to the PCI I/F 216, as well as an AC-3/MPEG audio decoder/encoder 222 which is also connected to the PCI I/F 216. In this way, the video and audio bitstreams from the PCI I/F 216 can be separately decoded or encoded by decoders/encoders 218 and 222, respectively. The decoding/encoding techniques are not limited to MPEG and AC-3, of course, and can include any known or future developed encoding technique. It is noted that the decoder/encoder 224 may be solely a decoder or an encoder depending on the input signal received by the DVR 102. For example, if an analog signal is received via the input port 210, the signal may be encoded for storage on the HDD 208 for playback at a later time. The encoded signal may then be decoded for viewing on the display device 112, as described below.

In order to more efficiently decode or encode the MPEG bitstream, the MPEG A/V decoder/encoder 218 may also include a memory device 220 connected thereto. This memory 220 may be eliminated, consolidated with decoder 218 or consolidated with the other memories 206 and/or 214. memory 220 has the same attributes as memory 206 and 214, and may be replaced with any of the other above-noted alternative memory devices.

The video encoder 226 in one embodiment may be an NTSC, PAL, HDTV encoder that encodes, or converts the digital video output from decoder 224 into an analog or other digital signal for display on the display device 112. The display device 112 may be an analog or digital output device capable of handling a digital, decoded output from the video encoder 226.

Figure 3:
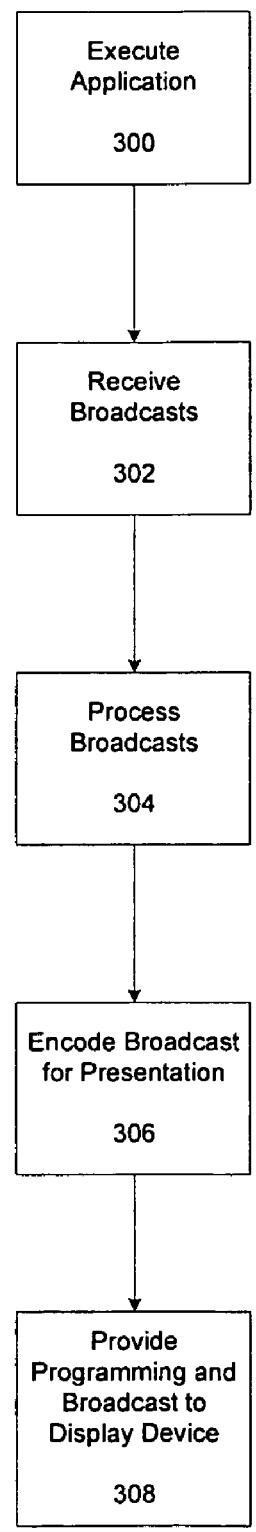
FIGS. 3-4 is a flowchart of the exemplary processes performed to provide alerting.

Referring to FIG. 3, there are exemplary processes performed by the present invention to provide alerting/bulletins/messages, etc. to viewers. The present invention provides for delivery of bulletins, alerts, breaking news, etc., to DVRs 102. According to an embodiment, the alerting service is provided on the DVR 102 as an application that is stored initially on the HDD 208 and loaded into memory 206 when executed (step 300). The DVR 102 is configured with geographic information, such as a ZIP code or telephone area code such that the DVR 102 is able to determine its geographic location. A data channel on the satellite downlink 118 or cable connection 108 is set for broadcasting the emergency bulletins. A central database system receives the emergency bulletins from various sources, reformats the bulletins, and transmits them on the data channel on the downlink 118 (step 302).

The DVR 102 will process the bulletins received via the data channel and select those which are geographically relevant (step 304). Alternatively, the satellite/cable provider may filter the broadcasts before sending them to the DVR 102 such that the DVR 102 receives only those broadcasts and alerts that are geographically relevant. The DVR 102 display the bulletins on top of the video signal that it is sending to the display device 112 (step 306). This may be performed using the video encoder 226, which would encode the bulletin with the content being retrieved from the HDD 208 for playback. The bulletin is displayed even if the user is pausing, rewinding, fast-forwarding, altering the display of the program content, or controlling the DVR (step 308). It is noted that the program content may include content that was previously recorded and stored on the HDD 208, or content that is in a buffer either on the HDD 208 or one of memories 206, 214 or 220.

Figure 4:
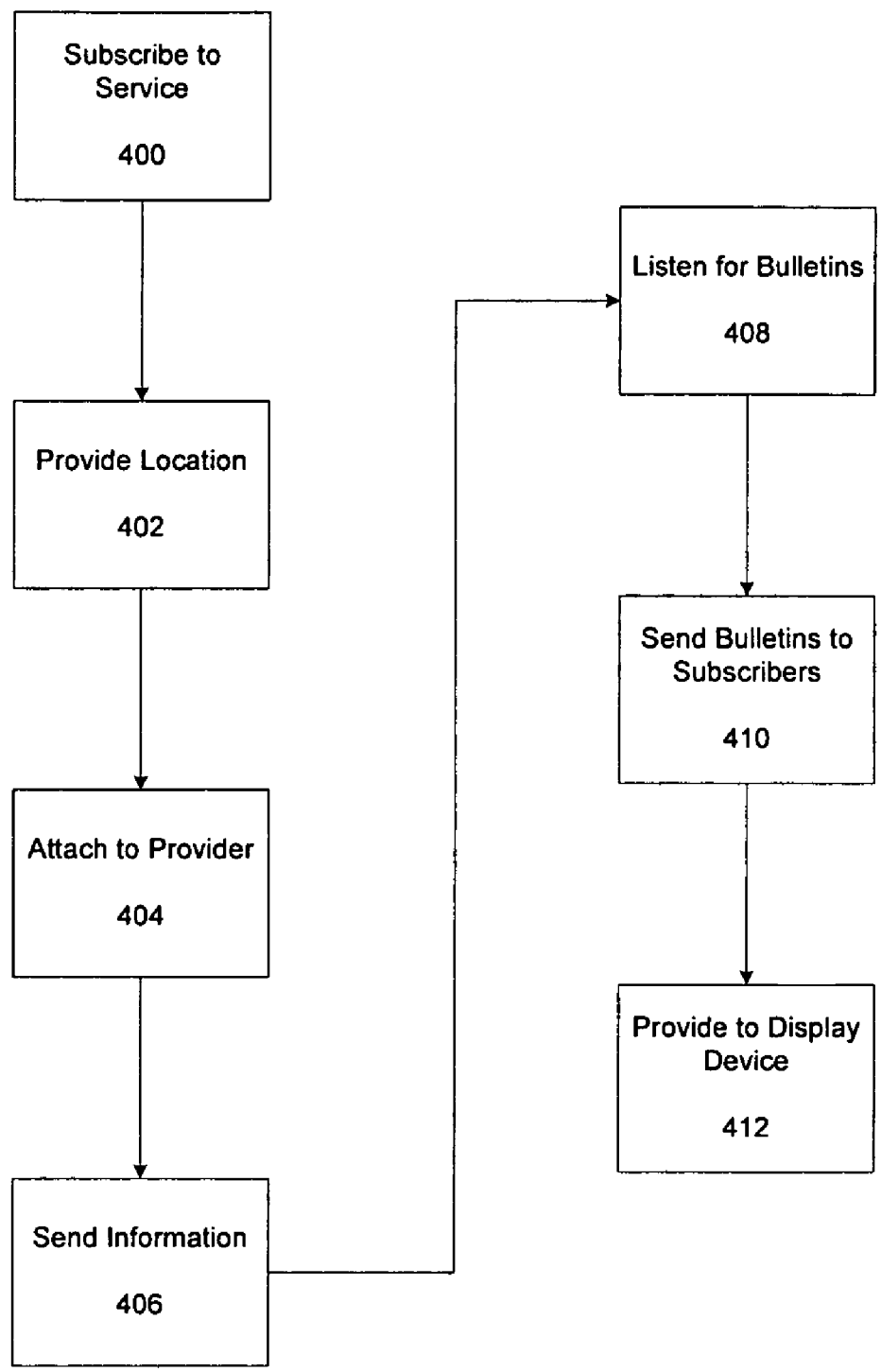

FIG. 4 illustrates another embodiment, where the bulletins are provided as part of a subscription service. Initially, the consumer subscribes to the subscription service (step 400). This service may be offered as part of an add-on to the program guide or other service the user receives. As part of the sign-up process, the subscriber enters their address, ZIP code, area code, etc., which will be used in selecting which bulletins they will receive via the service (step 402).

A central database system maintains a database of subscribers and a database of emergency bulletins. The DVR 102 attaches to the Internet/service provider 114 (step 404). The DVR 102 is connected to the central database system and sends identifying information (step 406). The identifying information is preferably encrypted. The DVR 102 will then "listen" on the connection for emergency bulletins (step 408).

As the central database system receives emergency bulletins from various sources, the central database determines which subscribers will receive which bulletins using information from the subscriber database. The bulletins are sent to the DVRs 102 which are connected for those subscribers (step 410). The DVR 102 will display the bulletins on top of the video signal that it is sending to the display device 112 (step 412). Again, the bulletin may be displayed even if the user is pausing, rewinding, fast-forwarding, altering the display of the program, or controlling the DVR. It is again noted that the program content may include content that was previously recorded and stored on the HDD 208, or content that is in a buffer either on the HDD 208 or one of memories 206, 214 or 220.

The alerting mechanism may be implemented on other devices, such as a set-top, personal computer, handheld device, etc. through which the user is viewing recorded content. It is noted that within these devices, the operation of the present invention would be substantially similar. For example, a handheld device may receive bulletins via a wireless connection, whereas the personal computer may receive them via a wireless or wired connection. Those of ordinary skill in the art would recognize the many possible variations of delivery of bulletins to the various different devices.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A method of providing a message to viewers watching recorded content on a computing device, comprising:
   providing a location to a service, the location being stored in a subscriber database;
   listening to messages at said service to determine if a message is relevant to said location;
   receiving, from said service, said message at said computing device via a communication medium;
   superimposing said message over said recorded content; and
   outputting said recorded content having said message thereon.

2. The method of claim 1, further comprising:
   processing said message to determine if said message contains information that is geographically relevant to a predetermined location; and
   if said message is not geographically relevant, ignoring said message.

3. The method of claim 1, said outputting further comprising providing said recorded content having said message during fast forward, rewind and pause operations.

4. The method of claim 1, further comprising encoding said message and said recorded content for a display device connected to said computing device.

5. The method of claim 1, said communication medium comprising one of a satellite transmission, cable transmission, modem connection and a broadband connection.

6. The method of claim 1, further comprising outputting said recorded content having said message thereon where said recorded content is retrieved from a mass storage device or from a buffer.

* * * * *